US012812316B2

(12) United States Patent
Umminger, III

(10) Patent No.: US 12,812,316 B2
(45) Date of Patent: Nov. 24, 2026

(54) AUDIO MIXING USING COMBINED ROTATION AND TRANSLATION

(71) Applicant: Roblox Corporation, San Mateo, CA (US)

(72) Inventor: Frederick William Umminger, III, Oakland, CA (US)

(73) Assignee: Roblox Corporation, San Mateo, CA (US)

(*) Notice: Subject to any disclaimer, the term of this patent is extended or adjusted under 35 U.S.C. 154(b) by 45 days.

(21) Appl. No.: 18/990,779

(22) Filed: Dec. 20, 2024

(65) Prior Publication Data

US 2025/0220376 A1 Jul. 3, 2025

Related U.S. Application Data

(60) Provisional application No. 63/616,723, filed on Dec. 31, 2023.

(51) Int. Cl.
*H04S 7/00* (2006.01)

(52) U.S. Cl.
CPC ............. *H04S 7/30* (2013.01); *H04S 2400/11* (2013.01)

(58) Field of Classification Search
CPC ........ H04S 2400/11; H04S 7/30; H04S 7/302; G06F 3/16; G06F 3/165; G06F 3/167
USPC ............................ 381/17–22, 56–58; 700/94
See application file for complete search history.

(56) References Cited

U.S. PATENT DOCUMENTS

| | | | | |
|---|---|---|---|---|
| 2010/0169799 | A1* | 7/2010 | Hyndman | A63F 13/30 718/1 |
| 2018/0288558 | A1* | 10/2018 | Umminger, III | H04S 7/303 |
| 2019/0306651 | A1* | 10/2019 | Vilermo | G06F 3/012 |
| 2021/0074366 | A1* | 3/2021 | Horisaki | G11C 29/06 |
| 2021/0112232 | A1* | 4/2021 | Tsukagoshi | H04L 65/70 |
| 2022/0086203 | A1* | 3/2022 | Morris | G06F 3/165 |
| 2024/0290020 | A1* | 8/2024 | Grossinger | G10L 21/10 |

OTHER PUBLICATIONS https://en.wikipedia.org/wiki/Spherical_harmonics.
"https://en.wikipedia.org/wiki/Harmonic_polynomial".
Mi. A.. Gerzon, "Periphony: With-Height Sound Reproduction,", J. Audio Eng. Soc., vol. 21, No. 1, pp. 2-10, (Feb. 1973.). doi: , https://www.aes.org/e-lib/browse.cfm?elib=2012.
(Continued)

*Primary Examiner* — Lun-See Lao
(74) *Attorney, Agent, or Firm* — IP Spring

(57) ABSTRACT

According to one aspect of the present disclosure, a method of audio-signal processing by a client device is provided. The method may include obtaining, by a processor of the client device, a first audio sample associated with a first sound field of an avatar. The method may include converting, by the processor, the first audio sample of the first sound field to a mathematical representation of a group of combined translations and rotations of the virtual experience. The method may include approximating, by the processor, a second sound field of the avatar in the virtual experience at a second time different than the first time based on the mathematical representation of the group of combined translations and rotations of the virtual experience. The method may include outputting, by the processor, a second audio sample associated with the second sound field at the client device.

20 Claims, 6 Drawing Sheets

(56) References Cited

OTHER PUBLICATIONS

Mi. A.. Gerzon, “Practical Periphony: The Reproduction of Full-Sphere Sound,”, Paper 1571, Journal of the Audio Engineering Society, (Feb. 1980.). doi:, https://www.aes.org/e-lib/browse.cfm?elib=3794.

* cited by examiner

AUDIO MIXING USING COMBINED ROTATION AND TRANSLATION

CROSS-REFERENCE TO RELATED APPLICATIONS

This application is a non-provisional application that claims priority under 35 U.S.C. § 119(e) to U.S. Provisional Patent Application No. 63/616,723, filed on Dec. 31, 2023, the contents of which are hereby incorporated by reference herein in its entirety.

TECHNICAL FIELD

Embodiments relate generally to online virtual experience platforms, and more particularly, to methods, systems, and computer readable media for audio-signal processing.

BACKGROUND

Online platforms, such as virtual experience platforms and online gaming platforms, can perform audio mixing for a client device at one or more cloud server(s).

For example, some virtual experience networks perform audio mixing of a sound field (e.g., that is made up of sound sources that include other avatars and/or objects in a virtual environment) at one or more cloud server(s). This can potentially allow for many more simultaneous in-virtual experience sounds than can be produced on a client device. For instance, this may allow an audio mix for thousands of voice-activated users with thousands of sound emitters.

However, one challenge of mixing and sending audio over the network is the unavoidable latency. For instance, during the time that it takes for a completed audio mix to reach the client device from the cloud server, the avatar on the client device may have moved to a new listening position. Consequently, by the time the client device outputs the received audio, the avatar and the sound emitters (e.g., other avatars or objects) may occupy different relative positions than when the mix was created. This may cause audio output to the listener to be noticeably wrong, thereby degrading the quality of the immersive experience.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a method of audio-signal processing by a client device is provided. The method may include obtaining, by a processor of the client device, a first audio sample associated with a first sound field of an avatar. The avatar may be at a first position in a virtual experience at a first time. The method may include converting, by the processor, the first audio sample of the first sound field to a mathematical representation of a group of combined translations and rotations of the virtual experience. The method may include approximating, by the processor, a second sound field of the avatar in the virtual experience at a second time different than the first time based on the mathematical representation of the group of combined translations and rotations of the virtual experience. The avatar may be at a second position in the virtual experience at the second time. The method may include outputting, by the processor, a second audio sample associated with the second sound field at the client device.

In some implementations, the mathematical representation of the group of combined translations and rotations of the virtual experience may be associated with a plurality of sound channels. In some implementations, each of the plurality of sound channels may be associated with a respective sound source in the virtual experience.

In some implementations, approximating the second sound field may include computing, by the processor, a matrix based on the mathematical representation of the group of combined translations and rotations of the virtual experience. In some implementations, approximating the second sound field may include converting, by the processor, the first audio sample to a first plurality of vectors associated with the first sound field. In some implementations, approximating the second sound field may include obtaining, by the processor, a second plurality of vectors associated with the second sound field by multiplying the matrix and the first plurality of vectors.

In some implementations, the method may include converting, by the processor, the second plurality of vectors associated with the second sound field to the second audio sample.

In some implementations, converting the second plurality of vectors associated with the second sound field to the second audio sample may include calculating, by the processor, a Taylor series of the first sound field.

In some implementations, the Taylor series of the first sound field may be calculated based on derivatives of solutions to a wave equation associated with a sound source in the virtual experience at the first time. In some implementations, derivatives of the solutions to the wave equation may be associated with spherical harmonics and reciprocals of a distance from the avatar to the sound source.

In some implementations, calculating the Taylor series of the first sound field may include identifying, by the processor, an element of the first sound field that is normal or closest to being normal to a vector from a sound source position to the first position. In some implementations, calculating the Taylor series of the first sound field may include dividing, by the processor, values associated with the first audio sample by a distance from the sound source position to the first position to obtain a coefficient of the vector from the sound source position to the first position.

In some implementations, converting the second plurality of vectors associated with the second sound field to the second audio sample may include applying, by the processor, the Taylor series of the first sound field to the second plurality of vectors to obtain the second audio sample.

In some implementations, the first sound field may be associated with a plurality of sound sources at respective first sound source positions. In some implementations, the respective first sound source positions are associated with a respective first location and orientation of the plurality of sound sources. In some implementations, the second sound field is associated with the plurality of sound sources at respective second sound source positions. In some implementations, the respective second sound source positions may be associated with a respective second location and orientation of the plurality of sound sources.

In some implementations, the first position of the avatar may be associated with a first location and orientation. In some implementations, the second position of the avatar may be associated with a second location and orientation.

According to another aspect of the present disclosure, a computing device for audio-signal processing by a client device is provided. The computing device may include a processor and memory coupled to the processor and storing instructions. The memory storing instructions, which when executed by the processor, cause the processor to perform operations. The operations may include obtaining a first audio sample associated with a first sound field of an avatar. The avatar may be at a first position in a virtual experience at a first time. The operations may include converting the first audio sample of the first sound field to a mathematical representation of a group of combined translations and rotations of the virtual experience. The operations may include approximating a second sound field of the avatar in the virtual experience at a second time different than the first time based on the mathematical representation of the group of combined translations and rotations of the virtual experience. The avatar may be at a second position in the virtual experience at the second time. The operations may include outputting a second audio sample associated with the second sound field at the client device.

In some implementations, the mathematical representation of the group of combined translations and rotations of the virtual experience may be associated with a plurality of sound channels. In some implementations, each of the plurality of sound channels may be associated with a respective sound source in the virtual experience.

In some implementations, approximating the second sound field may include computing a matrix based on the mathematical representation of the group of combined translations and rotations of the virtual experience. In some implementations, approximating the second sound field may include converting the first audio sample to a first plurality of vectors associated with the first sound field. In some implementations, approximating the second sound field may include obtaining a second plurality of vectors associated with the second sound field by multiplying the matrix and the first plurality of vectors.

In some implementations, the operations may include converting the second plurality of vectors associated with the second sound field to the second audio sample.

In some implementations, converting the second plurality of vectors associated with the second sound field to the second audio sample may include calculating a Taylor series of the first sound field.

In some implementations, the Taylor series of the first sound field may be calculated based on derivatives of solutions to a wave equation associated with a sound source in the virtual experience at the first time. In some implementations, the derivatives of the solutions to the wave equation may be associated with spherical harmonics and reciprocals of a distance from the avatar to the sound source.

In some implementations, calculating the Taylor series of the first sound field may include identifying an element of the first sound field that is normal or closest to being normal to a vector from a sound source position to the first position. In some implementations, calculating the Taylor series of the first sound field may include dividing values associated with the first audio sample by a distance from the sound source position to the first position to obtain a coefficient of the vector from the sound source position to the first position.

In some implementations, converting the second plurality of vectors associated with the second sound field to the second audio sample may include applying the Taylor series of the first sound field to the second plurality of vectors to obtain the second audio sample.

In some implementations, the first sound field may be associated with a plurality of sound sources at respective first sound source positions. In some implementations, the respective first sound source positions are associated with a respective first location and orientation of the plurality of sound sources. In some implementations, the second sound field is associated with the plurality of sound sources at respective second sound source positions. In some implementations, the respective second sound source positions may be associated with a respective second location and orientation of the plurality of sound sources.

In some implementations, the first position of the avatar may be associated with a first location and orientation. In some implementations, the second position of the avatar may be associated with a second location and orientation.

According to a further aspect, a non-transitory computer-readable medium storing instructions is provided. The instructions, which when executed by a processor of a client device, may cause the processor to perform operations. The operations may include obtaining a first audio sample associated with a first sound field of an avatar. The avatar may be at a first position in a virtual experience at a first time. The operations may include converting the first audio sample of the first sound field to a mathematical representation of a group of combined translations and rotations of the virtual experience. The operations may include approximating a second sound field of the avatar in the virtual experience at a second time different than the first time based on the mathematical representation of the group of combined translations and rotations of the virtual experience. The avatar may be at a second position in the virtual experience at the second time. The operations may include outputting a second audio sample associated with the second sound field at the client device.

In some implementations, the mathematical representation of the group of combined translations and rotations of the virtual experience may be associated with a plurality of sound channels. In some implementations, each of the plurality of sound channels may be associated with a respective sound source in the virtual experience.

In some implementations, approximating the second sound field may include computing a matrix based on the mathematical representation of the group of combined translations and rotations of the virtual experience. In some implementations, approximating the second sound field may include converting the first audio sample to a first plurality of vectors associated with the first sound field. In some implementations, approximating the second sound field may include obtaining a second plurality of vectors associated with the second sound field by multiplying the matrix and the first plurality of vectors.

In some implementations, the operations may include converting the second plurality of vectors associated with the second sound field to the second audio sample.

In some implementations, converting the second plurality of vectors associated with the second sound field to the second audio sample may include calculating a Taylor series of the first sound field.

In some implementations, the Taylor series of the first sound field may be calculated based on derivatives of solutions to a wave equation associated with a sound source in the virtual experience at the first time. In some implementations, the derivatives of the solutions to the wave equation may be associated with spherical harmonics and reciprocals of a distance from the avatar to the sound source.

In some implementations, calculating the Taylor series of the first sound field may include identifying an element of the first sound field that is normal or closest to being normal to a vector from a sound source position to the first position. In some implementations, calculating the Taylor series of the first sound field may include dividing values associated with the first audio sample by a distance from the sound source position to the first position to obtain a coefficient of the vector from the sound source position to the first position.

In some implementations, converting the second plurality of vectors associated with the second sound field to the second audio sample may include applying the Taylor series of the first sound field to the second plurality of vectors to obtain the second audio sample.

In some implementations, the first sound field may be associated with a plurality of sound sources at respective first sound source positions. In some implementations, the respective first sound source positions are associated with a respective first location and orientation of the plurality of sound sources. In some implementations, the second sound field is associated with the plurality of sound sources at respective second sound source positions. In some implementations, the respective second sound source positions may be associated with a respective second location and orientation of the plurality of sound sources.

In some implementations, the first position of the avatar may be associated with a first location and orientation. In some implementations, the second position of the avatar may be associated with a second location and orientation.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
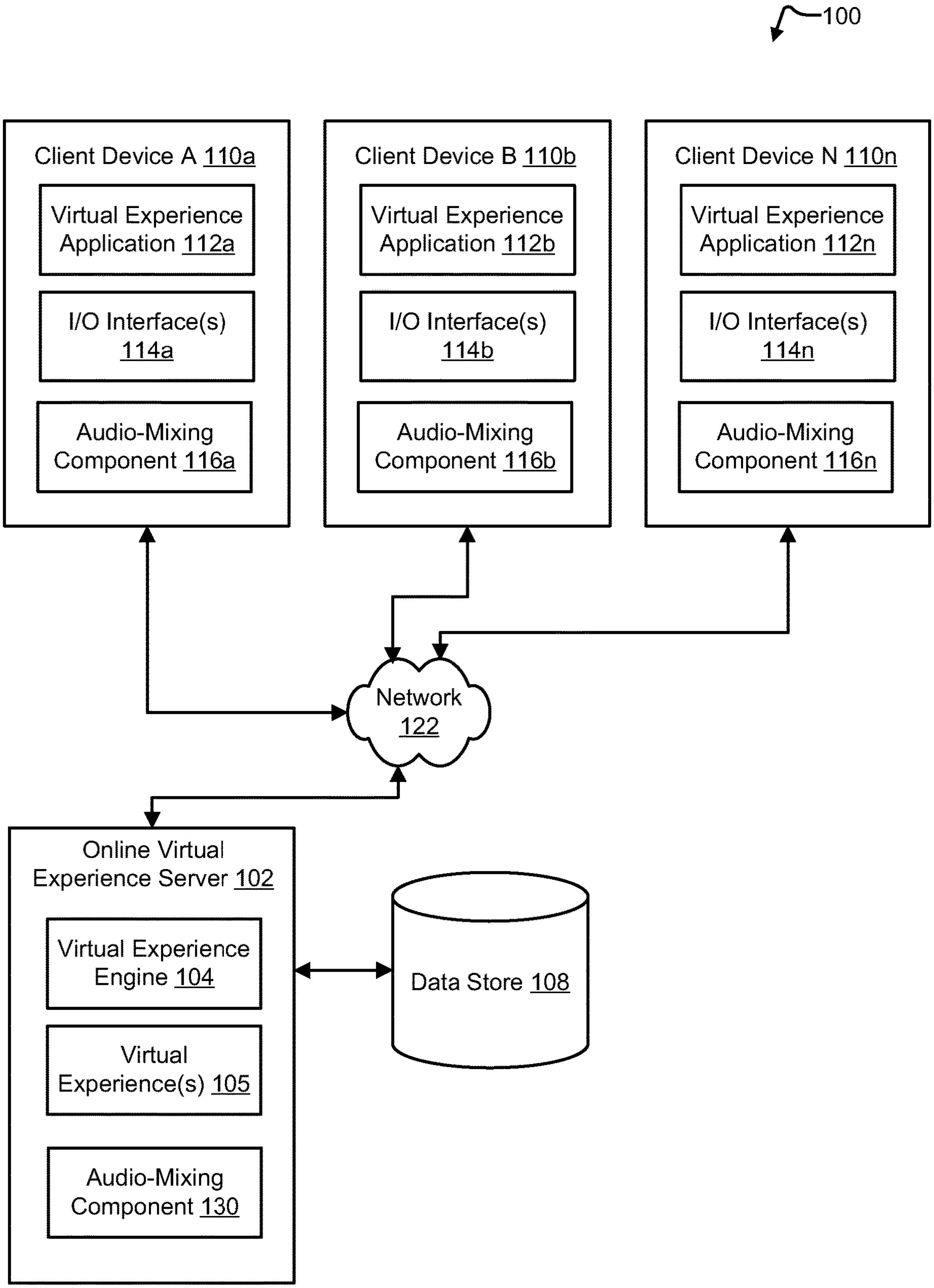
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Features described herein provide spatialized audio for output at client devices connected to an online platform, such as, for example, an online experience platform or an online-gaming platform. The online platform may provide a virtual metaverse having a plurality of metaverse places associated therewith. Virtual avatars associated with users can traverse and interact with the metaverse places, as well as items, characters, other avatars, and objects within the metaverse places. The avatars can move from one metaverse place to another metaverse place, while experiencing spatialized audio that provides for a more immersive and enjoyable experience. Spatialized audio streams from a plurality of users (e.g., or avatars associated with a plurality of users) and/or objects can be prioritized based on many factors, such that rich audio can be provided while taking into consideration position, velocity, movement, and actions of avatars and characters, as well as bandwidth, processing, and other capabilities of the client devices.

Through prioritizing and combining different audio streams, a combined spatialized audio stream can be provided for output at a client device that provides a rich user experience, reduced number of computations for providing the spatialized audio, as well as reduced bandwidth while not detracting from the virtual, immersive experience. Additionally, a spatial audio application programming interface (API) is defined that enables users and developers to implement spatialized audio for almost any online experience, thereby allowing production of high quality online virtual experiences, games, metaverse places, and other interactions that have immersive audio while requiring reduced technical proficiency of users and developers.

Online experience platforms and online gaming platforms (also referred to as "user-generated content platforms" or "user-generated content systems") offer a variety of ways for users to interact with one another. For example, users of an online experience platform may create games or other content or resources (e.g., characters, graphics, items for game play and/or use within a virtual metaverse, etc.) within the online platform.

Users of an online experience platform may work together towards a common goal in a metaverse place, game, or in game creation; share various virtual items (e.g., inventory items, game items, etc.), engage in audio chat (e.g., spatialized audio chat), send electronic messages to one another, and so forth. Users of an online experience platform may interact with others and play games, e.g., including characters (avatars) or other game objects and mechanisms. An online experience platform may also allow users of the platform to communicate with each other. For example, users of the online experience platform may communicate with each other using voice messages (e.g., via voice chat with spatialized audio), text messaging, video messaging (e.g., including spatialized audio), or a combination of the above. Some online experience platforms can provide a virtual three-dimensional (3D) environment or multiple environments linked within a metaverse, in which users can interact with one another or play an online game.

In order to help enhance the entertainment value of an online experience platform, the platform can provide rich audio for playback at a user device. The audio can include, for example, different audio streams from different users or other sound sources, as well as background audio. According to various implementations described herein, the different audio streams can be transformed into spatialized audio streams. The spatialized audio streams may be combined, for example, to provide a combined spatialized audio stream for playback at a client device. Furthermore, prioritized audio streams may be provided such that the amount of bandwidth used to transmit the audio packet(s) is limited while still providing immersive, spatialized audio. Moreover, background audio streams may be combined with the spatialized audio, such that realistic background noise/effects are also played back to users. Even further, characteristics of a metaverse place, such as surrounding mediums (e.g., air, water, other, etc.), reverberations, reflections, aperture sizes, wall density, ceiling height, doorways, hallways, object placement, non-player objects/characters, and other characteristics are utilized in creating the spatialized audio and/or the background audio to increase realism and immersion within the online virtual experience.

For large 3D multiplayer games, some gaming networks perform audio mixing of a sound field (e.g., that is made up of sound sources that include other avatars and/or objects in a virtual environment) at one or more cloud server(s). This can potentially allow for many more simultaneous in-game sounds than can be produced on a client device.

One problem with mixing audio in a cloud server is that there is a delay between the time when the audio is mixed and when it is played back on the client device. That is, between the time the audio is mixed and when it is played back, there is an encoding of the audio, transmission of the encoded audio over a network, and decoding of the audio at the client device. Each of these operations is associated with a respective latency, which can cause a playback delay of, e.g., hundreds of milliseconds.

During this delay, action in the game on the client device will typically progress. Consequently, a change in the location and orientation of the in-game audio listener (typically the player's avatar or the game's camera or a position in-between) and/or sound sources will occur during the delay. The result is that by the time the audio is played back, it no longer matches the relative location and orientation angles between the listener and the sound sources. This reduces the quality of the audio and can disrupt gameplay by causing confusion about where avatars and/or objects are located. For example, when this type of playback delay occurs, the audio output at the client device may sound like an enemy was to the right, when, in fact, the enemy has moved behind the listener's avatar.

One example technique to remedy this problem is to encode the audio mix in a spatial audio format that allows rotation of the audio after it is decoded. Examples of such formats include, e.g., object audio and Ambisonics. With the spatial audio format, the audio can be rotated to match the listener orientation after it has been received and decoded by the client device.

Using a spatial audio format works well for changes due to rotations, but it is unable to handle changes due to translations. For example, the player may have their avatar run past a sound source during the time audio is being transmitted over the network. Then, the player will hear a sound in front of the avatar when they should hear the sound from a source behind the avatar. A rotation of the audio cannot usually fix this problem, because it would rotate other more distant sound sources, which would then be heard from incorrect locations.

Therefore, it may be beneficial to have an audio encoding format that allows both translations and rotations of audio sources after decoding.

An example of the audio encoding format is object audio that generally requires an audio channel for each audio source. This technique lacks the advantage of reduced channel count that comes with mixing together audio from multiple sources. This can result in too many channels and too much bandwidth needed to transmit the audio.

To overcome these and other challenges, the present disclosure provides techniques modeled by Ambisonics. Ambisonics mixes audio to a collection of channels that form a finite-dimensional linear representation of the rotation group. This allows rotations to act on the audio after the mix. A rotation acts on the audio mix by being converted into a matrix multiplication of the channels via the linear representation.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The network environment 100 (also referred to as a "platform" herein) includes an online virtual experience server 102, a data store 108, a client device 110 (or multiple client devices), and a third-party server 118, all connected via a network 122.

The online virtual experience server 102 can include, among other things, a virtual experience engine 104, one or more virtual experiences 105, and an audio-mixing component 130. The online virtual experience server 102 may be configured to provide virtual experiences 105 to one or more client devices 110, and to provide automatic generation of inferred skeletal structures via the audio-mixing component 130, in some implementations.

Data store 108 is shown coupled to online virtual experience server 102 but in some implementations, can also be provided as part of the online virtual experience server 102. The data store may, in some implementations, be configured to store advertising data, user data, engagement data, and/or other contextual data in association with the audio-mixing component 130.

The client devices 110 (e.g., 110*a*, 110*b*, . . . , 110*n*) can include a virtual experience application 112 (e.g., 112*a*, 112*b*, . . . , 112*n*), an I/O interface 114 (e.g., 114*a*, 114*b*, . . . , 114*n*), and an audio-mixing component 116 (e.g., 116*a*, 116*b*, . . . , 116*n*) to interact with the online virtual experience server 102, and to view, for example, graphical user interfaces (GUI) through a computer monitor or display (not illustrated). In some implementations, the client devices 110 may be configured to execute and display virtual experiences, which may include virtual user engagement portals as described herein. The audio-mixing component 116 may be configured to perform the operations associated with audio-signal processing described below in connection with FIGS. 2-5.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination of a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (via client device 110) with access to online virtual experience server 102.

The online virtual experience server 102 may also include a website (e.g., one or more web pages) or application back-end software that may be used to provide a user with access to content provided by online virtual experience server 102. For example, users (or developers) may access online virtual experience server 102 using the virtual experience application 112 on client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, 3D games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the online virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110 (not illustrated). In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration, rather than limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience or another GUI of the network environment 100, a user may create an avatar that includes different body parts from different libraries.

Details of the operations performed by audio-mixing component 116 are described below with reference to FIGS. 2-4.

Figure 2:
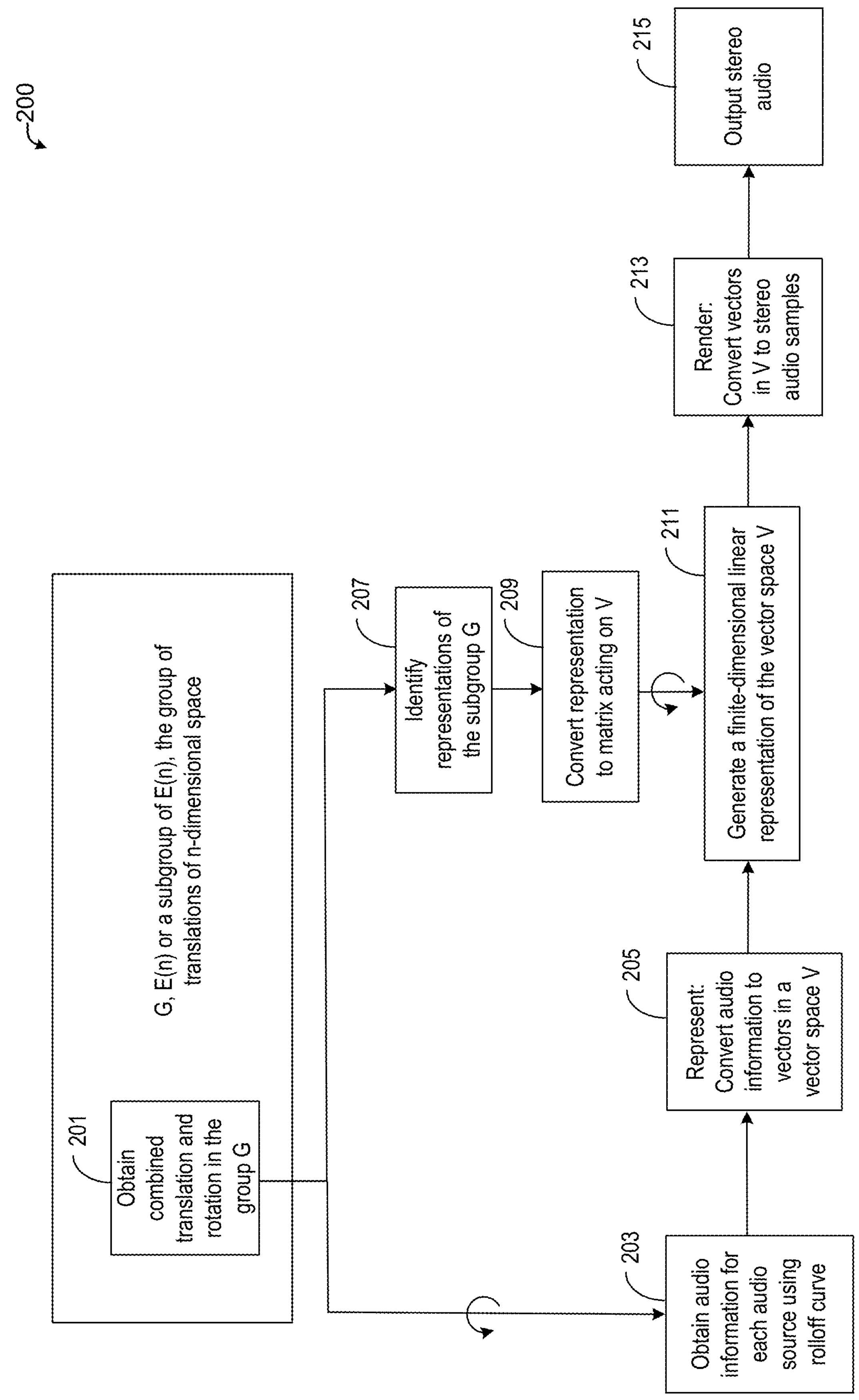
FIG. 2 is a schematic visualization of first example operations associated with audio-signal processing by a client device, in accordance with some implementations.
Figure 3:
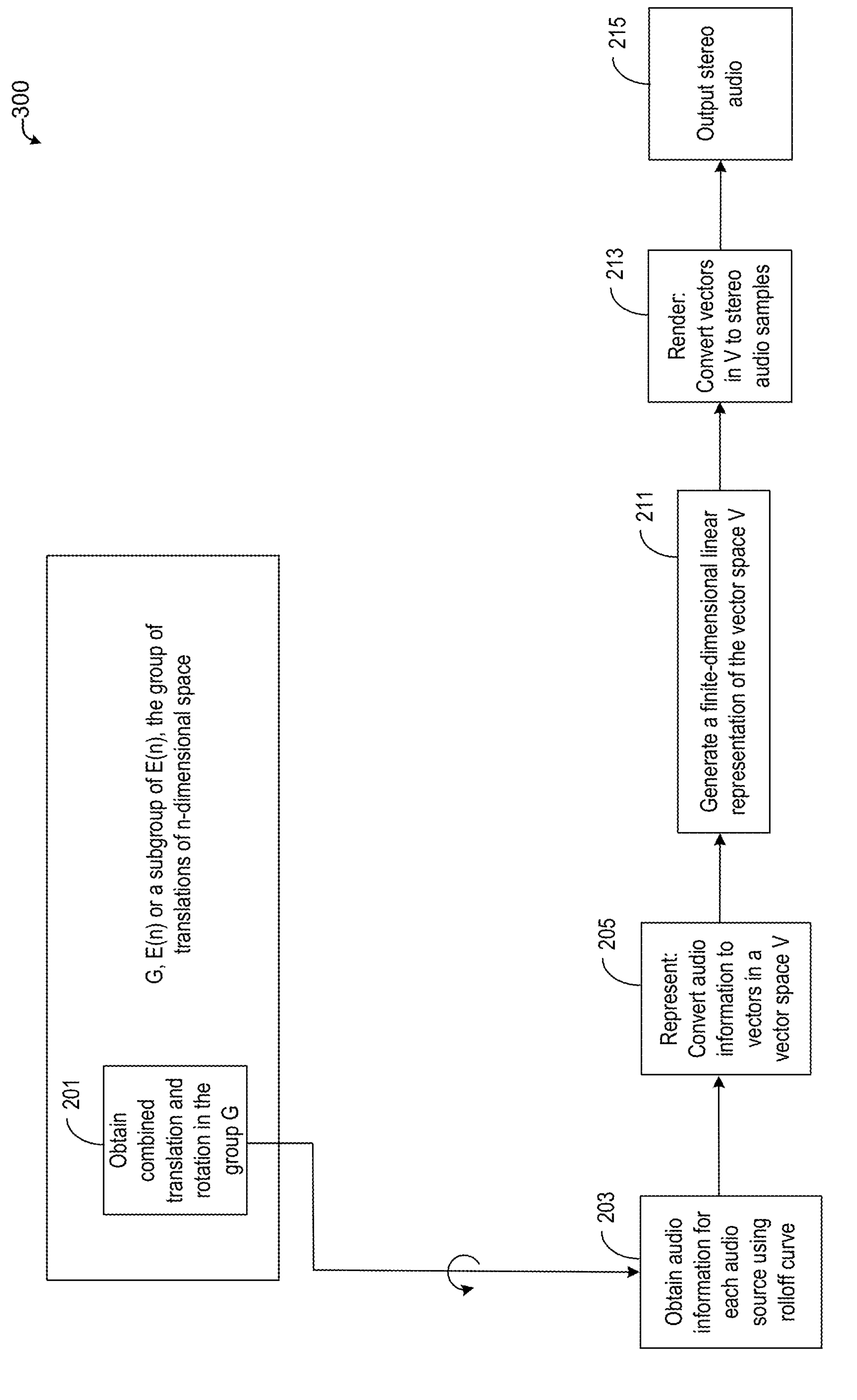
FIG. 3 is a schematic visualization of second example operations associated with audio-signal processing by a client device, in accordance with some implementations.
Figure 4:
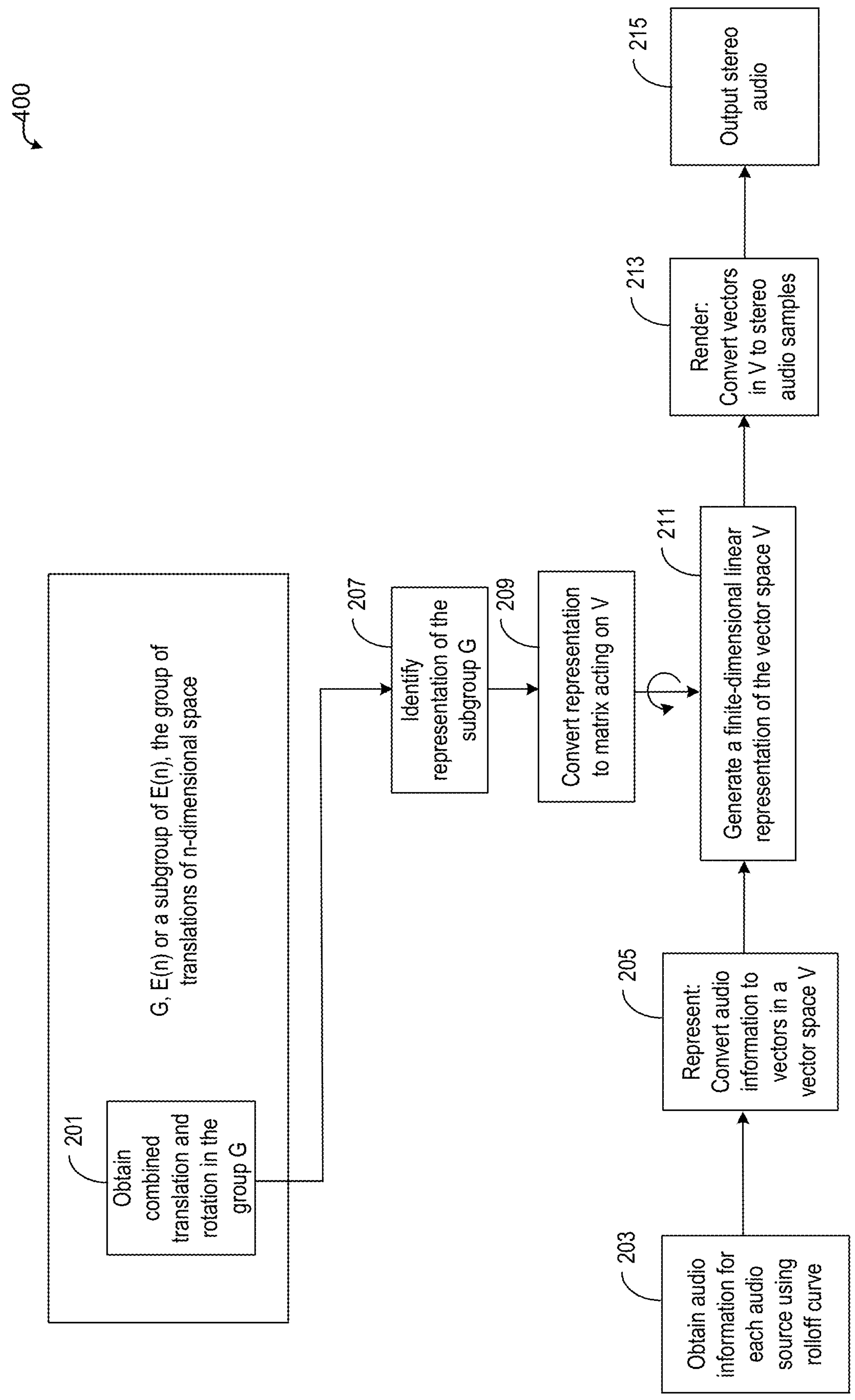
FIG. 4 is a schematic visualization of third example operations associated with audio-signal processing by a client device, in accordance with some implementations.

FIGS. 2-4: Operations of Audio-Signal Processing

FIG. 2 is a schematic visualization of first example operations 200 associated with audio-signal processing by a client device, in accordance with some implementations. FIG. 3 is a schematic visualization of second example operations 300 associated with audio-signal processing by a client device, in accordance with some implementations. FIG. 4 is a schematic visualization of third example operations 400 associated with audio-signal processing by a client device, in accordance with some implementations. In the following description of FIGS. 2-4, a group refers to the mathematical concept of a group, which is a set with a multiplication operation and inverse operation that obey certain rules; and position may refer to the location and orientation of a listener's avatar or an audio source in a 2D or a 3D space.

Referring to FIG. 2, in order to allow both translations and rotations to be represented, the audio-mixing component 116 generates a finite-dimensional linear representation of the Euclidean group E(n), which is the group of translations and rotations of audio output by audio sources in an n-dimensional space at a first time while a listener's avatar is at a first position. Based on the requirements of the virtual experience, the Euclidean group E(n) can either be E(2) (e.g., the group of translations and rotations in 2D space) or E(3) (e.g., the group of translations and rotations of 3D space).

For instance, E(2) may include only audio from those audio sources located in the same plane as the listener's avatar. E(3) may include audio from all audio sources located in the plane of the listener's avatar and the audio sources located in planes above and below the listener's avatar. For instance, if the listener's avatar is on the second floor of a three-story building and all audio sources are located in the building, E(2) would include only those audio sources located on the second floor, and E(3) would include the audio sources on all floors of the building.

The audio-mixing component 116 may use group G, which is E(n) or a subgroup of E(n), to obtain (at 201) an audio format with some limitations. For example, the symmetries of the platonic solids give finite subgroups of the group of rotations of 3D space. If the audio-mixing component 116 combines one of these subgroups with translations, then a combined translation and rotation in 3D space is obtained (at 201). The audio-mixing component 116 can approximate an arbitrary translation and rotation of 2D space or 3D space with the closest member of this group.

The combined translation and rotation of group G may include audio channels associated with one or more audio sources. Each of the one or more audio sources may be associated with a corresponding rolloff curve; and the audio-mixing component 116 may obtain (at 203) respective audio information (e.g., 2D or 3D audio information) for each audio source using its corresponding rolloff curve. The audio-mixing component 116 may access the corresponding rolloff curve for each of the one or more audio sources via a server or local database. The rolloff curve may represent a 2D or 3D distance attenuation of the sound emitted by the corresponding audio source. In other words, the rolloff curve is an area-over-distance curve (for 2D audio information) or volume-over-distance curve (for 3D audio information) that affects how loudly a listener will hear audio emitted by the audio source based on the distance between the listener's avatar and the audio source.

In some implementations, some audio sources may be associated with an inverse rolloff curve, while other audio sources may be associated with a quadratic rolloff curve. The inverse rolloff curve may be used for non-voice audio sources (e.g., such as a loudspeaker or siren), while the quadratic rolloff curve may be used for voice audio sources (e.g., such as other players' avatars). By way of example and not limitation, the inverse rolloff curve may replicate sound with a distance attenuation set with, e.g., a minimum distance of 4 and a maximum distance of 10000; and the quadratic rolloff curve may replicate sound with a distance attenuation set with, e.g., a minimum distance of 7 and a maximum distance of 80.

In either case, the rolloff curve may be represented by a table that maps distance keys to volume values. Keys are generally unique numbers greater than or equal to 0, while values are generally numbers between 0 and 1 (inclusive). Tables containing up to or more than 400 key-value pairs may be supported.

In some implementations, the audio-mixing component 116 may determine the volume of the audio from the perspective of the listener at a distance d from the audio source by linearly interpolating between the volume levels for the points on the rolloff curve whose distance values are directly above and below d. If there is either no point below d or no point above d, the volume of the other point is chosen. Essentially, the rolloff curve is a sequence of points connected by straight lines, and beyond its left and right endpoints, the curve extends outward infinitely at the respective volume levels of the endpoints.

The audio information obtained (at 203) by the audio-mixing component 116 may include 2D or 3D positional and directional audio information.

The audio-mixing component 116 may convert (at 205) the audio information of each audio source in group G to one or more polynomials (vectors) in vector space V. To convert (at 205) the audio information to vectors, the audio-mixing component 116 may define a suitable scalar multiplication operation on the group elements (e.g., the audio information of each audio source in the group G), while preserving the existing group addition (which must be abelian) and ensuring that the resulting structure satisfies all the axioms of a vector space over a sound field. Essentially, the audio-mixing component 116 embeds the group G within a larger vector space structure by associating each group element with a vector and defining how to multiply these vectors by scalars from the sound field.

The audio-mixing component 116 may identify (at 207) representations of the combined translations and rotations as P(N), the spaces of polynomial functions of degree less than N. For example, P(0) is the space of constant functions, P(1) the space of affine functions, and P(2) the space of quadratic functions. Any translation or rotation of a function in P(N) is also in P(N). Another collection of representations is P*(N), which is the duals of P(N). P*(N) is the space of linear functions from P(N) to the real numbers.

Audio is made up of a collection of channels. The audio-mixing component 116 may identify (at 207) a representation of the combined translation and rotation of group G as a plurality of polynomial functions, where each polynomial function corresponds to a respective audio source (channel) in group G. The audio-mixing component 116 may have translations and rotations act on the audio after the mix by converting (at 209) the representation to a matrix that acts on vector space V (e.g., the sound field).

The audio-mixing component 116 may generate (at 211) a finite-dimensional linear representation of the vector space V by multiplying the matrix (converted at 209) with the polynomials (converted at 205).

The techniques of converting the combined translation and rotation (performed collectively by operations 201, 203, and 205) of the group G commute with rotations (the rotations are calculated using operations 201, 207, and 209) such that the second example operations 300 of FIG. 3 have the same effect as the third example operations 400 of FIG. 4. Various examples of converting the audio information to polynomials in vector space V, and the corresponding conversion of the finite-dimensional linear representation to stereo audio (or another audio format) that approximates the sound field at a new listener position are provided below.

In some implementations, for E(2), the vector space V includes polynomials of the 2D space coordinates x, y of degree less than or equal to m for some m. The audio-mixing component 116 may convert (at 205) 2D audio information to polynomials (vectors) in vector space V by computing the Taylor series of what the sound pressure field would be at the original listener position on the 2D plane if the samples of audio were played by a source at the source position. The audio-mixing component 116 may perform these calculations by computing derivatives of solutions to the wave equation from a point source, which can be expressed in terms of spherical harmonics and reciprocals of the distance to the source. Once converted to polynomials in vector space V, a finite-dimensional linear representation of the vector space V is generated (at 211) by multiplying the matrix (converted at 209) with the polynomials in vector space V (converted at 205).

Then, the audio-mixing component 116 may convert (at 213) the matrix-multiplied polynomials (e.g., finite-dimensional linear representation of vector space V) to stereo audio or another audio format by using the Taylor series to approximate the 2D sound field near the original listener position, under the assumption that it only depends on 2D coordinates. Then, the audio-mixing component 116 may simulate what would be picked up from such a sound field by first-order directional microphones at the new listener position. For example, the audio-mixing component 116 may compute the simulation of the microphones from the value of the 2D sound field and its first derivatives.

In some implementations, for E(3), the vector space V includes polynomials of the 3D space coordinates x, y, z of degree less than or equal to m for some m. The audio-mixing component 116 may convert (at 205) the 3D audio information to polynomials in the vector space V by computing the Taylor series of what the sound pressure field would be at the original listener position if the audio samples were played by an audio source at the source position. In some implementations, the audio-mixing component 116 may perform these calculations by computing derivatives of solutions to the wave equation from a point source, which can be expressed in terms of spherical harmonics and reciprocals of the distance to the audio source. Once converted to polynomials in vector space V, a finite-dimensional linear representation of the vector space V is generated (at 211) by multiplying the matrix (converted at 209) with the polynomials in vector space V (converted at 205).

Then, the audio-mixing component 116 may convert (at 213) the matrix multiplied polynomials (e.g., the finite-dimensional linear representation of vector space V) to stereo audio or another audio format by using the Taylor series to approximate the 3D sound field near the original listener position. Then, the audio-mixing component 116 may simulate what would be picked up from such a sound field by first-order directional microphones at the new listener position. For example, the audio-mixing component 116 may compute the simulation of the microphones from the value of the 3D sound field and its first derivatives.

In some implementations, for E(3), the vector space V may include sixty (60) complex vectors that correspond to all rotations of the function e^{ikx}, which represents a complex plane wave aligned with the x-axis by elements of the icosahedral group. The audio-mixing component 116 may convert (at 205) the 3D audio information to polynomials in the vector space V by finding the element v of vector space V that is closest to being normal to the vector from the audio source to the original listener position. Then, the audio-mixing component 116 may divide the values of the 3D audio information by the distance from the audio source to the original listener position and use that as the coefficient of v. Once converted to polynomials in vector space V, a finite-dimensional linear representation of the vector space V is generated (at 211) by multiplying the matrix (converted at 209) with the polynomials in vector space V (converted at 205).

Then, the audio-mixing component 116 may convert (at 213) the matrix-multiplied polynomials (e.g., the finite-dimensional linear representation of vector space V) to stereo audio by using the Taylor series to approximate the 3D sound field near the original listener position. Then, the audio-mixing component 116 may simulate what would be picked up from such a sound field by first-order directional microphones at the new listener position. For example, the audio-mixing component 116 may compute the simulation of the microphones from the value of the 3D sound field and its first derivatives.

In some implementations, for E(3), the vector space V may include sixty (60) complex vectors that correspond to all rotations of the function e^{ikx}, which represents a complex plane wave aligned with the x-axis by elements of the icosahedral group. The audio-mixing component 116 may convert (at 205) the 3D audio information to polynomials in the vector space V by finding three such elements whose normals v1, v2, v3 surround the vector w from the audio source to the original listener position, computing the barycentric coordinates of where w intersects the triangle formed from v1, v2, v3, and applying the barycentric coordinates to the three elements that correspond to v1, v2, v3. Once converted to polynomials in vector space V, a finite-dimensional linear representation of the vector space V is generated (at 211) by multiplying the matrix (converted at 209) with the polynomials (converted at 205).

Then, the audio-mixing component 116 may convert (at 213) the matrix-multiplied polynomials (e.g., the finite-dimensional linear representation of vector space V) to stereo audio by converting the elements of vector space V into samples by treating the vector space V as a function on 3D space that represents the pressure of the sound field at the original listener position. Then, the audio-mixing component 116 may evaluate the samples and their derivatives at the new listener position in order to simulate what a first order microphone would record at that position.

In some implementations, for E(3), the vector space V may include sixty (60) complex vectors that correspond to all rotations of the function e^{ikx}, which represents a complex plane wave aligned with the x-axis by elements of the icosahedral group. The audio-mixing component 116 may convert (at 205) the 3D audio information to polynomials in the vector space V by treating vector space V as a space of functions and using any linear method to approximate the true function for the sound pressure field at the original listener position from the source by an element of v (e.g., by finding the element in v with minimal L_2 norm from the true sound pressure field, the L_2 norm computed over a region around the listener position). Once converted to polynomials in vector space V, a finite-dimensional linear representation of the vector space V is generated (at 211) by multiplying the matrix (converted at 209) with the polynomials (converted at 205).

Then, the audio-mixing component 116 may convert (at 213) the matrix-multiplied polynomials (e.g., the finite-dimensional linear representation of vector space V) to stereo audio by converting the elements of vector space V into samples by treating the vector space V as a function of 3D space that represents the pressure of the sound field at the original listener position. Then, the audio-mixing component 116 may evaluate the samples and their derivatives at the new listener position in order to simulate what a first order microphone would record at that position.

The audio-mixing component 116 may output (at 215) the stereo audio (or another audio format) associated with the new listener position.

Other methods contemplated by the present disclosure may use different groups G and different approximation techniques to represent and render audio at a new listener position.

Figure 5:
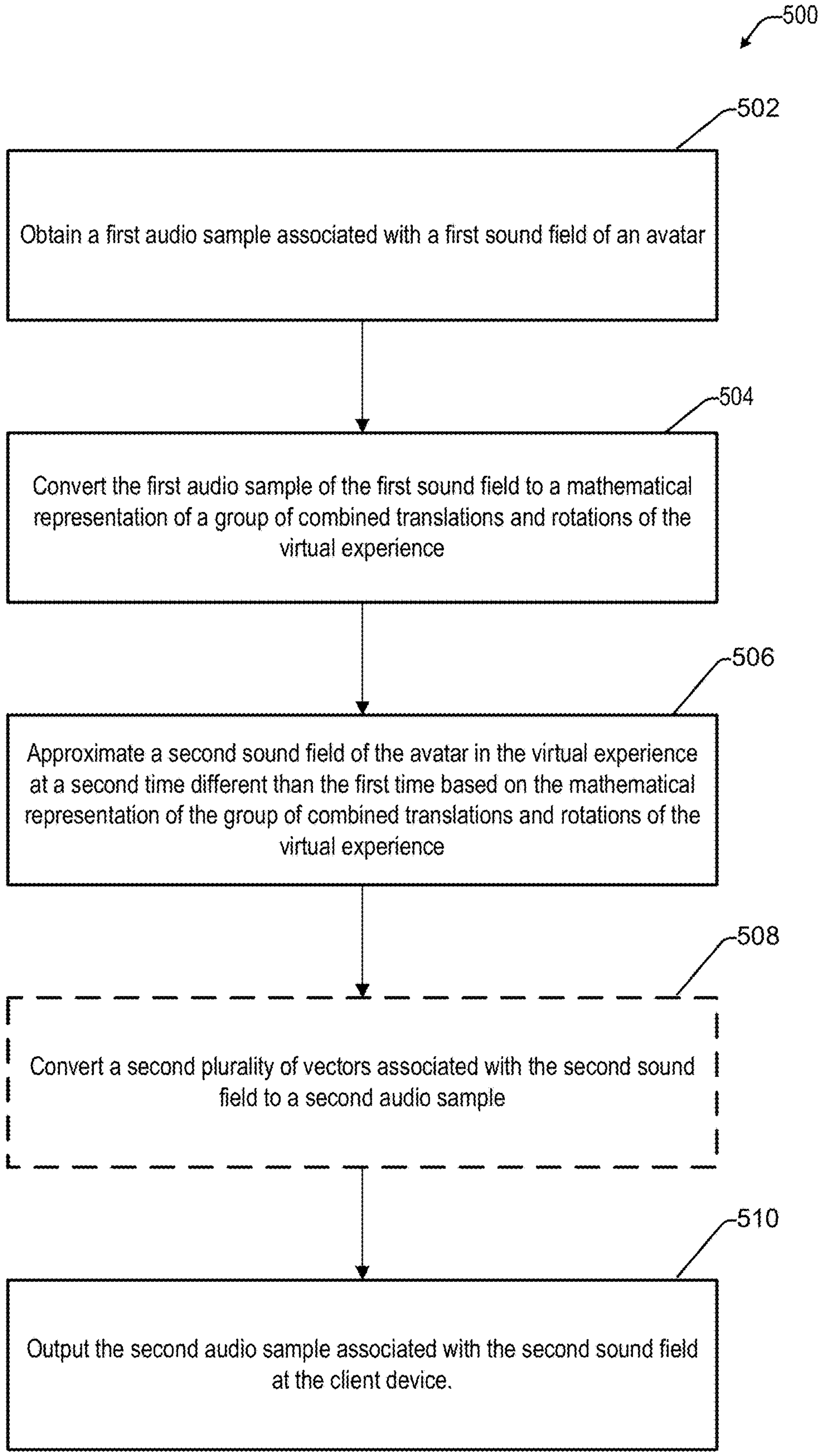
FIG. 5 is a flowchart for a method of audio-signal processing by a client device, in accordance with some implementations.

FIG. 5: Example Method(s) of Audio-Signal Processing

FIG. 5 is a flowchart for a method of audio-signal processing 500 (referred to hereinafter as "method 500") by a client device, in accordance with some implementations.

In some implementations, method 500 can be implemented, for example, on an online virtual experience server 102 described with reference to FIG. 1. In some implementations, some or all of the method 500 can be implemented on one or more client devices 110 as shown in FIG. 1, on one or more developer devices (not illustrated), or on one or more server device(s), and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 500. In some examples, a first device is described as performing blocks of method 500. Some implementations can have one or more blocks of methods 500 performed by one or more other devices (e.g., other client devices or server devices) that can send results or data to the first device. Optional operations may be indicated with dashed lines.

Referring to FIG. 5, at 502, a first audio sample associated with a first sound field of an avatar may be obtained. The avatar may be at a first position in a virtual experience at a first time. In some implementations, the first position of the avatar may be associated with a first location and orientation.

In some implementations, the first sound field may be associated with a plurality of sound sources at respective first sound source positions. In some implementations, the respective first sound source positions may be associated with a respective first location and orientation of the plurality of sound sources.

Block 502 may be followed by block 504. At 504, the first audio sample of the first sound field may be converted to a mathematical representation of a group of combined translations and rotations of the virtual experience. In some implementations, the mathematical representation of the group of combined translations and rotations of the virtual experience may be associated with a plurality of sound channels. In some implementations, each of the plurality of sound channels may be associated with a respective sound source in the virtual experience.

Block 504 may be followed by block 506. At 506, a second sound field of the avatar in the virtual experience at a second time different than the first time may be approximated based on the mathematical representation of the group of combined translations and rotations of the virtual experience. The avatar may be at a second position in the virtual experience at the second time. In some implementations, the second position of the avatar may be associated with a second location and orientation.

In some implementations, approximating the second sound field may include computing a matrix based on the mathematical representation of the group of combined translations and rotations of the virtual experience. In some implementations, approximating the second sound field may include converting the first audio sample to a first plurality of vectors associated with the first sound field. In some implementations, approximating the second sound field may include obtaining a second plurality of vectors associated with the second sound field by multiplying the matrix and the first plurality of vectors.

In some implementations, the second sound field may be associated with the plurality of sound sources at respective second sound source positions. In some implementations, the respective second sound source positions may be associated with a respective second location and orientation of the plurality of sound sources.

Block 506 may be followed by block 508. At 508, a second plurality of vectors associated with the second sound field may be converted to a second audio sample. In some implementations, converting the second plurality of vectors associated with the second sound field to the second audio sample may include calculating a Taylor series of the first sound field.

In some implementations, the Taylor series of the first sound field may be calculated based on derivatives of solutions to a wave equation associated with a sound source in the virtual experience at the first time. In some implementations, the derivatives of the solutions to the wave equation may be associated with spherical harmonics and reciprocals of a distance from the avatar to the sound source.

In some implementations, calculating the Taylor series of the first sound field may include identifying an element of the first sound field that is normal or closest to being normal to a vector from a sound source position to the first position. In some implementations, calculating the Taylor series of the first sound field may include dividing values associated with the first audio sample by a distance from the sound source position to the first position to obtain a coefficient of the vector from the sound source position to the first position.

In some implementations, converting the second plurality of vectors associated with the second sound field to the second audio sample may include applying the Taylor series of the first sound field to the second plurality of vectors to obtain the second audio sample.

Block 508 may be followed by block 510. At 510, the second audio sample associated with the second sound field may be output at the client device.

Figure 6:
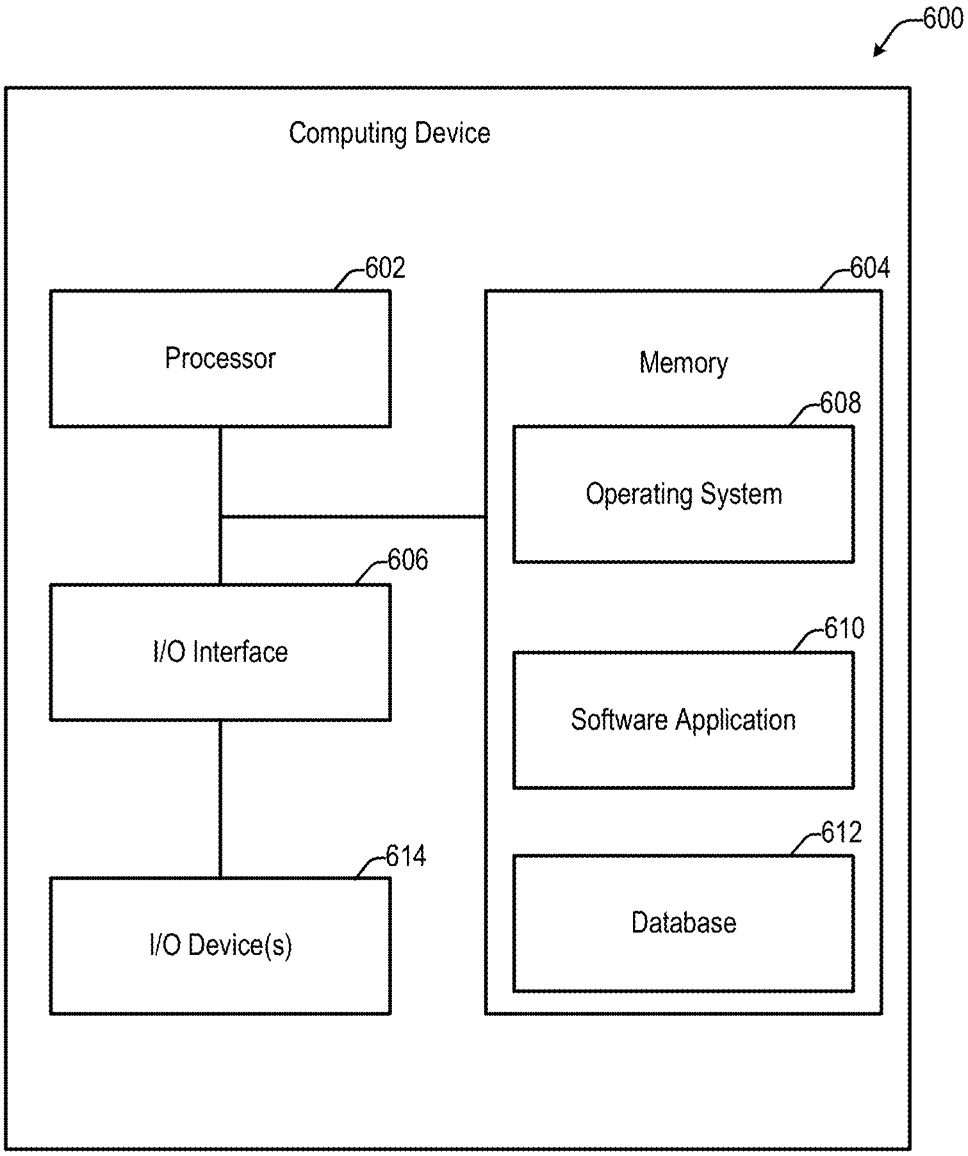
FIG. 6 is a block diagram illustrating an example computing device, in accordance with some implementations.

FIG. 6: Computing Devices

Hereinafter, a more detailed description of various computing devices that may be used to implement different devices and/or components illustrated in FIG. 1 is provided with reference to FIG. 6.

FIG. 6 is a block diagram of an example computing device 600 which may be used to implement one or more features described herein, in accordance with some implementations. In one example, computing device 600 may be used to implement a computer device, (e.g., 102, 110 of FIG. 1), and perform appropriate operations as described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, computing device 600 includes a processor 602, a memory 604, input/output (I/O) interface 606, and audio/video input/output devices 614 (e.g., display screen, touchscreen, display goggles or glasses, audio speakers, headphones, microphone, etc.).

Processor 602 can be one or more processors and/or processing circuits to execute program code and control basic operations of the computing device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in computing device 600 for access by the processor 602 and may include any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the computing device 600 by the processor 602, including an operating system 608, software application 610 and associated database 612. In some implementations, the software application 610 can include instructions that enable processor 602 to perform the functions described herein. Software application 610 may include some or all of the functionality required to perform audio-signal processing. In some implementations, one or more portions of software application 610 may be implemented in dedicated hardware such as an application-specific integrated circuit (ASIC), a programmable logic device (PLD), a field-programmable gate array (FPGA), a machine learning processor, etc. In some implementations, one or more portions of software application 610 may be implemented in general purpose processors, such as a central processing unit (CPU) or a graphics processing unit (GPU). In various implementations, suitable combinations of dedicated and/or general-purpose processing hardware may be used to implement software application 610.

For example, software application 610 stored in memory 604 can include instructions for performing audio-signal processing. Any of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the computing device 600 with other systems and devices. For example, network communication devices, storage devices (e.g., memory and/or data store 108), and input/output devices can communicate via I/O interface 606. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 6 shows one block for each of processor 602, memory 604, I/O interface 606, operating system 608, software application 610, and database 612. These blocks may represent one or more processors or processing circuitries, operating systems, memories, I/O interfaces, applications, and/or software modules. In other implementations, computing device 600 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, or similar system, or any suitable processor or processors associated with such a system, may perform the operations described.

A user device can also implement and/or be used with features described herein. Example user devices can be computer devices including some similar components as the computing device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the computing device 600 to display images pre- and post-processing as described herein, where such display device can include any suitable display device, e.g., a liquid crystal display (LCD), a light-emitting diode (LED), or plasma display screen, cathode-ray tube (CRT), television, monitor, touchscreen, 3D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method of audio-signal processing by a client device, comprising:

obtaining, by a processor of the client device, a first audio sample associated with a first sound field of an avatar, wherein the avatar is at a first position in a virtual experience at a first time;

converting, by the processor, the first audio sample of the first sound field to a mathematical representation of a group of combined translations and rotations of the virtual experience;

approximating, by the processor, a second sound field of the avatar in the virtual experience at a second time different than the first time based on the mathematical representation of the group of combined translations and rotations of the virtual experience, wherein the avatar is at a second position in the virtual experience at the second time; and outputting, by the processor, a second audio sample associated with the second sound field at the client device.

2. The method of claim 1, wherein:

the mathematical representation of the group of combined translations and rotations of the virtual experience is associated with a plurality of sound channels, and each of the plurality of sound channels is associated with a respective sound source in the virtual experience.

3. The method of claim 1, wherein approximating the second sound field comprises:

computing, by the processor, a matrix based on the mathematical representation of the group of combined translations and rotations of the virtual experience;

converting, by the processor, the first audio sample to a first plurality of vectors associated with the first sound field; and obtaining, by the processor, a second plurality of vectors associated with the second sound field by multiplying the matrix and the first plurality of vectors.

4. The method of claim 3, further comprising:

converting, by the processor, the second plurality of vectors associated with the second sound field to the second audio sample.

5. The method of claim 4, wherein converting the second plurality of vectors associated with the second sound field to the second audio sample comprises:

calculating, by the processor, a Taylor series of the first sound field.

6. The method of claim 5, wherein:

the Taylor series of the first sound field is calculated based on derivatives of solutions to a wave equation associated with a sound source in the virtual experience at the first time, and the derivatives of the solutions to the wave equation are associated with spherical harmonics and reciprocals of a distance from the avatar to the sound source.

7. The method of claim 5, wherein calculating the Taylor series of the first sound field comprises:

identifying, by the processor, an element of the first sound field that is normal or closest to being normal to a vector from a sound source position to the first position; and dividing, by the processor, values associated with the first audio sample by a distance from the sound source position to the first position to obtain a coefficient of the vector from the sound source position to the first position.

8. The method of claim 5, wherein converting the second plurality of vectors associated with the second sound field to the second audio sample comprises:

applying, by the processor, the Taylor series of the first sound field to the second plurality of vectors to obtain the second audio sample.

9. The method of claim 1, wherein:

the first sound field is associated with a plurality of sound sources at respective first sound source positions, the respective first sound source positions are associated with a respective first location and orientation of the plurality of sound sources, the second sound field is associated with the plurality of sound sources at respective second sound source positions, and the respective second sound source positions are associated with a respective second location and orientation of the plurality of sound sources.

10. The method of claim 1, wherein:

the first position of the avatar is associated with a first location and orientation, and the second position of the avatar is associated with a second location and orientation.

11. A computing-device for audio-signal processing by a client device, comprising:

a processor; and memory coupled to the processor and storing instructions, which when executed by the processor, cause the processor to perform operations comprising:

obtaining a first audio sample associated with a first sound field of an avatar, wherein the avatar is at a first position in a virtual experience at a first time;

converting the first audio sample of the first sound field to a mathematical representation of a group of combined translations and rotations of the virtual experience;

approximating a second sound field of the avatar in the virtual experience at a second time different than the first time based on the mathematical representation of the group of combined translations and rotations of the virtual experience, wherein the avatar is at a second position in the virtual experience at the second time; and outputting a second audio sample associated with the second sound field at the client device.

12. The computing-device of claim 11, wherein approximating the second sound field comprises:

computing a matrix based on the mathematical representation of the group of combined translations and rotations of the virtual experience;

converting the first audio sample to a first plurality of vectors associated with the first sound field; and obtaining a second plurality of vectors associated with the second sound field by multiplying the matrix and the first plurality of vectors.

13. The computing-device of claim 12, wherein the operations further comprise:

converting the second plurality of vectors associated with the second sound field to the second audio sample.

14. The computing-device of claim 13, wherein converting the second plurality of vectors associated with the second sound field to the second audio sample comprises:

calculating a Taylor series of the first sound field.

15. The computing-device of claim 14, wherein:

the Taylor series of the first sound field is calculated based on derivatives of solutions to a wave equation associated with a sound source in the virtual experience at the first time, and the derivatives of the solutions to the wave equation are associated with spherical harmonics and reciprocals of a distance from the avatar to the sound source.

16. The computing-device of claim 14, wherein calculating the Taylor series of the first sound field comprises:

identifying an element of the first sound field that is normal or closest to being normal to a vector from a sound source position to the first position; and dividing values associated with the first audio sample by a distance from the sound source position to the first position to obtain a coefficient of the vector from the sound source position to the first position.

17. The computing-device of claim 14, wherein converting the second plurality of vectors associated with the second sound field to the second audio sample comprises:

applying the Taylor series of the first sound field to the second plurality of vectors to obtain the second audio sample.

18. The computing-device of claim 11, wherein:

the first sound field is associated with a plurality of sound sources at respective first sound source positions, the respective first sound source positions are associated with a respective first location and orientation of the plurality of sound sources, the second sound field is associated with the plurality of sound sources at respective second sound source positions, and the respective second sound source positions are associated with a respective second location and orientation of the plurality of sound sources.

19. The computing-device of claim 11, wherein:

the first position of the avatar is associated with a first location and orientation, and the second position of the avatar is associated with a second location and orientation.

20. A non-transitory computer-readable medium storing instructions, which when executed by a processor of a client device, cause the processor to perform operations comprising:

obtaining a first audio sample associated with a first sound field of an avatar, wherein the avatar is at a first position in a virtual experience at a first time;

converting the first audio sample of the first sound field to a mathematical representation of a group of combined translations and rotations of the virtual experience;

approximating a second sound field of the avatar in the virtual experience at a second time different than the first time based on the mathematical representation of the group of combined translations and rotations of the virtual experience, wherein the avatar is at a second position in the virtual experience at the second time; and outputting a second audio sample associated with the second sound field at the client device.

* * * * *